US008503403B2

(12) United States Patent
Camp, Jr. et al.

(10) Patent No.: US 8,503,403 B2
(45) Date of Patent: Aug. 6, 2013

(54) NETWORK CONTROL OF UPLINK TRANSMIT TIMING FOR COMPRESSED MODE

(75) Inventors: William O. Camp, Jr., Chapel Hill, NC (US); Terrence Edward Rogers, Durham, NC (US); Nadi Sakir Findikli, Cary, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1336 days.

(21) Appl. No.: 11/669,542

(22) Filed: Jan. 31, 2007

(65) Prior Publication Data

US 2008/0151812 A1 Jun. 26, 2008

Related U.S. Application Data

(63) Continuation-in-part of application No. 11/614,488, filed on Dec. 21, 2006.

(51) Int. Cl.
*H04B 7/216* (2006.01)
*H04J 3/06* (2006.01)

(52) U.S. Cl.
USPC ........... 370/335; 370/342; 370/350; 370/503; 455/453

(58) Field of Classification Search
USPC ................ 370/320, 310, 317, 318, 331, 335, 370/342, 350, 441, 503; 455/453
See application file for complete search history.

(56) References Cited

U.S. PATENT DOCUMENTS

| 6,567,670 | B1 * | 5/2003 | Petersson ..................... 455/522 |
| 6,618,365 | B1 | 9/2003 | Vannatta et al. |
| 7,016,320 | B1 * | 3/2006 | Petersson et al. ............. 370/331 |
| 7,245,880 | B1 | 7/2007 | Jacobsen |
| 7,616,660 | B2 * | 11/2009 | Hosein et al. ................. 370/468 |
| 7,680,055 | B1 * | 3/2010 | Ramakrishnan et al. ..... 370/238 |
| 7,684,408 | B2 * | 3/2010 | Wakabayashi ............. 370/395.4 |
| 7,701,910 | B2 * | 4/2010 | Yoon et al. .................... 370/335 |
| 2003/0193969 | A1 | 10/2003 | Pecen et al. |
| 2006/0034239 | A1 * | 2/2006 | Abeta et al. .................. 370/341 |
| 2006/0251014 | A1 | 11/2006 | Castor |

FOREIGN PATENT DOCUMENTS

| CN | 1371191 A | 9/2002 |
| CN | 1442001 A | 9/2003 |
| CN | 1627658 A | 6/2005 |
| CN | 1695384 A | 11/2005 |

(Continued)

OTHER PUBLICATIONS

Carnero, J.O."Uplink Capacity Enhancement in WCDMA", Mar. 31, 2004.*

(Continued)

*Primary Examiner* — Ajit Patel
(74) *Attorney, Agent, or Firm* — Coats & Bennett, P.L.L.C.

(57) ABSTRACT

A base station measures the uplink load on an uplink channel and controls the transmit timing of one or more mobile terminals on the uplink channel based on the measurements of the uplink load. The transmit timing of the mobile terminals may be controlled by sending timing control signals to the mobile terminals over a downlink control channel. In one embodiment, the transmit timing of the uplink channel is slaved to the transmit timing on a downlink channel. In this case, the uplink timing may be controlled by adjusting the downlink transmit timing.

18 Claims, 7 Drawing Sheets

FOREIGN PATENT DOCUMENTS

| | | |
|---|---|---|
| DE | 10053205 A1 | 5/2002 |
| EP | 1137203 A2 | 9/2001 |
| EP | 1626608 A1 | 2/2006 |
| EP | 1708427 A1 | 10/2006 |
| FR | 2858903 A1 | 2/2005 |
| GB | 2359700 A * | 8/2001 |
| WO | 97/40593 | 10/1997 |
| WO | 00/38349 A1 | 6/2000 |
| WO | 00/74291 A1 | 12/2000 |
| WO | 2006007058 A1 | 1/2006 |

OTHER PUBLICATIONS

Carnero, J. O. "Uplink Capacity Enhancement in WCDMA." PhD Thesis for the Department of Communication Technology, Institute of Electronic Systems, Aalborg University, Mar. 31, 2004. Available at: http://Kom.aau.dk/ADM/research/reports/Reivew%20Carnero.pdf.

International Search Report, International Application No. PCT/US2007/077728, Date of Mailing: Mar. 20, 2008.

International Search Report, International Application No. PCT/US2007/077732, Date of Mailing:Mar. 20, 2008.

Annex to Form PCT/IDS/206, Communication Relating to the Results of the Partial International Search, International Application No. PCT/US2007/077051, Date of Mailing: May 7, 2008.

PCT—International Search Report dated Oct. 15, 2008, for Application No. PCT/US2007/077051, Filed Aug. 29, 2007.

1st Office Action issued Nov. 30, 2011 in re CN 200780051613.6.

3RD Generation Partnership Project, "Multiplexing and channel coding (FDD)," Technical Specification Group Radio Access Network, 3GPP TS 25.212 V5.10.0, (Jun. 2005), (Release 5).

CN Search Report issued Feb. 20, 2013 in re CN Application No. 200780051613.6 filed Aug. 20, 2009.

* cited by examiner

NETWORK CONTROL OF UPLINK TRANSMIT TIMING FOR COMPRESSED MODE

RELATED APPLICATIONS

This application is a continuation-in-part of U.S. patent application Ser. No. 11/614,488 filed Dec. 21, 2006 titled "Compressed Mode for Reducing Power Consumption," which is incorporated herein by reference in its entirety.

BACKGROUND

The present invention relates generally to compressed mode operation in a mobile communication system, and more particularly, to methods of controlling timing of uplink transmission by a plurality of mobile terminals operating in compressed mode.

A known problem with WCDMA phones is excessive power consumption that results in undesirable current drain and short battery life. When engaged in normal voice communications, a WCDMA phone transmits and receives continuously. This continuous operation is one of the primary reasons for the undesirable current drain in WCDMA phones. Another reason for current drain is the presence of a duplexer in the transmit path that increases path loss.

U.S. patent application Ser. No. 11/614,488 describes a method of reducing power consumption in a WCDMA phone by allowing the mobile terminals to switch to a compressed mode of operation. In the compressed mode, the mobile terminals transmit intermittently with a desired duty factor rather than continuously and increase their transmit power during the "on" periods to maintain the same data rate. Problems may arise with compressed mode operation if a significant number of mobile terminals operate in a compressed mode at the same time. Because the mobile terminals normally increase their transmit power in compressed mode, they will interfere with other users if too many mobile terminals transmit at the same time in the compressed mode. Further, too many mobile terminals switching their transmitters on and off at the same time may result in undesirably large swings in the uplink load.

SUMMARY

The present invention provides a method of controlling transmit timing of one or more mobile terminals operating in a compressed mode so as to reduce fluctuations in the uplink load. In one embodiment, a base station measures the uplink load on an uplink channel and controls the transmit timing of one or more mobile terminals on the uplink channel based on the measurements of the uplink load. The transmit timing of the mobile terminals may be controlled by sending timing control signals to the mobile terminals over a downlink control channel. In one embodiment, the transmit timing of the uplink channel is slaved to the transmit timing on a downlink channel. In this case, the uplink timing may be controlled by adjusting the downlink transmit timing.

DETAILED DESCRIPTION

The present invention provides a method of reducing power consumption in a radio communication system. The present invention is described herein in the context of a WCDMA radio communication system, though the techniques may be applied in other radio communication systems. Further, this application explains how the principles of the present invention can be applied to a voice channel in a WCDMA system. However, the principles described herein may also be applied to other types of information, such as audio, video, and other data.

Figure 1:
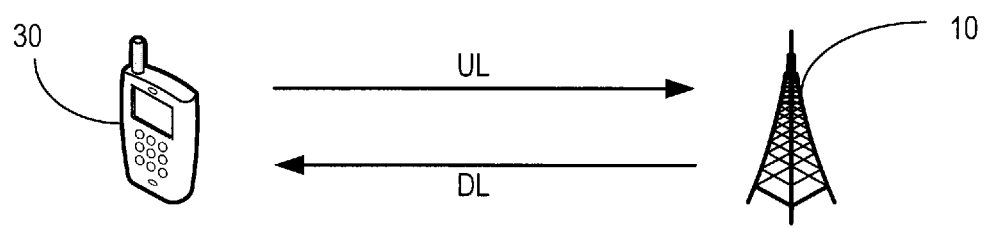
FIG. 1 is a schematic diagram of a communication system.

FIG. 1 illustrates communications between a base station 10 and a mobile terminal 30 in a mobile communication system. The base station 10 transmits voice to the mobile terminal 30 over a downlink channel (DL). The mobile terminal 30 transmits voice to the base station 10 over an uplink channel (UL). The voice channels may be circuit-switched or packet-switched channels. For normal voice communications, the transmitter and receiver of the mobile terminal 30 are turned on continuously. The "always on" characteristic of voice communications in WCDMA systems results in excessive drain on battery power of the mobile terminal 30.

U.S. patent application Ser. No. 11/614,488 titled COMPRESSED MODE FOR REDUCING POWER CONSUMPTION filed Dec. 21, 2006 describes a method of reducing power consumption in a WCDMA phone by allowing the mobile terminals 30 to switch to a compressed mode of operation. In the compressed mode, the mobile terminals 30 transmit intermittently with a desired duty factor rather than continuously, and increase their transmit power during the "on" periods to maintain the same data rate. This application is incorporated herein in its entirety by reference. To briefly summarize, the base station 10 continuously monitors the uplink load and sends control signals to one or more mobile terminals 30 to selectively enable and disable compressed mode operation depending on the uplink load. In general, compressed operation is enabled when the base station 10 has excess capacity on the uplink given the current loading conditions. If the uplink is heavily loaded, compressed mode is disabled. When the compressed mode is enabled, the mobile terminals 30 individually switch between the compressed mode (e.g. intermittent transmission) and normal mode (e.g., continuous transmission) on the uplink depending on the current transmit power level of the mobile terminal 30. When the current transmit power of the mobile terminal 30 is low and the mobile terminal 30 has sufficient power headroom, it uses compressed mode for uplink communications. Otherwise, the mobile terminal 30 transmits in normal mode on the uplink.

Figure 2:
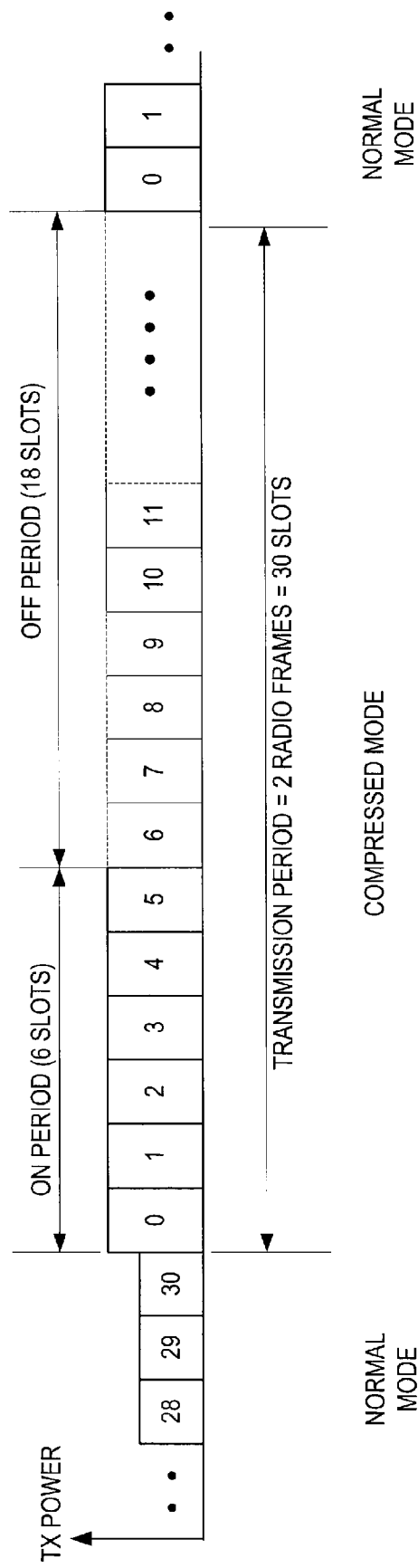
FIG. 2 illustrates an exemplary compression pattern with a 20% duty cycle.

FIG. 2 illustrates one implementation of compressed mode. A compression pattern is defined for a given transmission period. In one exemplary embodiment, the transmission period may be equal to two 10 millisecond radio frames. Each radio frame includes fifteen slots of 0.667 milliseconds duration. Thus, the transmission period comprises thirty slots or 20 milliseconds. In this example, the 20 millisecond transmission period is selected to match the vocoder time block for WCDMA. The compression pattern specifies the slots in which the transmitter is turned off. In this example, the compression pattern is represented by the bitmap 111111000000000000000000000000, where a 0 indicates an idle slot and a 1 indicates a slot during which the mobile terminal 30 transmitter is turned on. Slots coinciding with periods when the transmitter is turned off are referred to herein as "off slots" or "idle slots." Slots coinciding with periods when the transmitter is turned on are called "on slots" or "compressed mode slots." A series of consecutive slots in which the transmitter is turned on is referred to herein as an "on period." A series of consecutive slots in which the transmitter is turned off is referred to herein as an "off period" or "idle period." The duty factor equals the number of on slots divided by the total number of slots in the transmission period. Thus, a 20% duty factor means that the transmitter is turned on for six slots in a 30-slot transmission period. The on slots may be consecutive, or may be distributed over the transmission period.

FIG. 2 illustrates a compression pattern with a 20% duty factor. In this exemplary pattern, the transmitter is turned on in slots 0-5, and is turned on in slots 6-29. The compression pattern is repeat the mobile terminal 30 is operating in the compressed mode. The location of the on slots in the transmission period can be varied. Assuming that the on slots are consecutive, up to five compression patterns can be defined with non-overlapping off periods. When a mobile terminal 30 operates in compressed mode with a 20% duty factor, the mobile terminal 30 can select a compression pattern from any one of these six compression patterns. As noted earlier, allowing the mobile terminals 30 to select different compression patterns with the same duty factor prevents all of the mobile terminals 30 operating in the compressed mode from transmitting at the same time.

Figure 3:
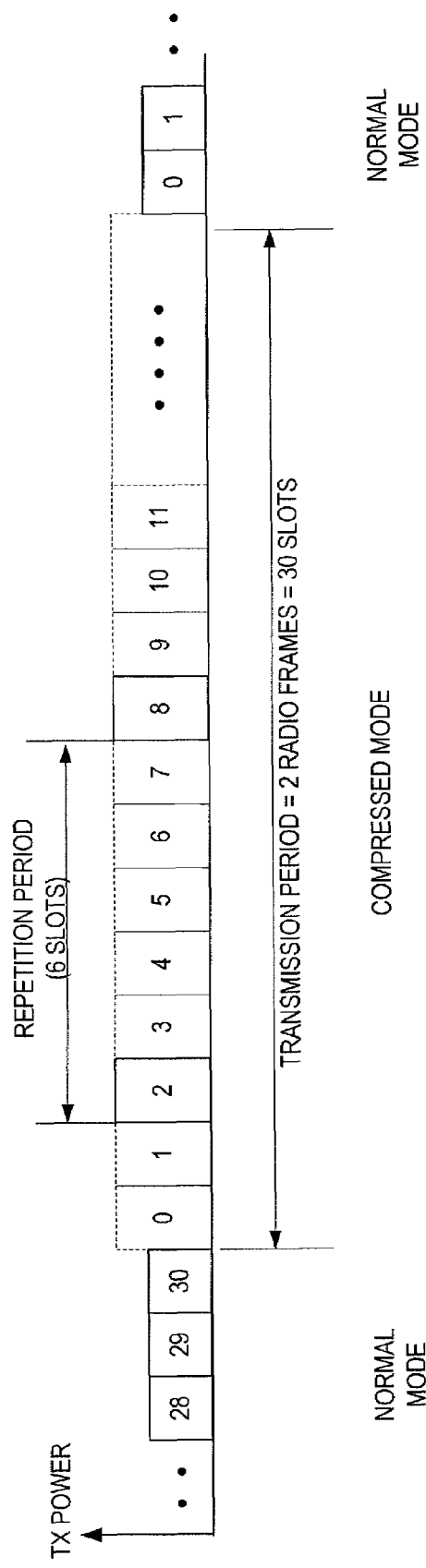
FIG. 3 illustrates another exemplary compression pattern with a 20% duty cycle.

FIG. 3 illustrates another exemplary compression pattern with a 20% duty factor. In this example, the mobile terminals 30 transmit in evenly spaced slots with a repetition period of six slots. In FIG. 3, the mobile terminal 30 transmits in every sixth slot beginning with slot 2 and ending with slot 32. As in the previous example, six non-overlapping compression patterns may be defined.

When the mobile terminal 30 is operating in the compressed mode, the mobile terminal 30 may increase the transmit power during on periods if necessary in order to maintain a desired data rate as shown in FIG. 2. For example, if a transmit power level of 21 dBm is needed to transmit at an agreed-upon data rate in a normal mode, the mobile terminal 30 may need to increase the transmit power to 24 dBm in order to apply a 50% duty factor in compressed mode and maintain the data rate. Alternatively, the data rate could be reduced. For instance, the Adaptive Multiple Rate coding scheme could drop the codec rate from 12.2 kbps to some lower rate to offset the need to decrease the WCDMA UL Spreading Factor and accordingly, increase the mobile transmit power. Please note that this could happen independently of the downlink voice codec rate and spreading factor used for the downlink. Even though the transmit power will often have to be increased, at low transmit power levels there is little or no increase in current drain on the power amplifier to supply this higher power, and at higher power levels the higher current drain is for less time and will generally be breakeven when averaged over a time period long relative to the compressed mode pattern. In both cases, there is a substantial gain from turning OFF all the hardware for periods of time. In this case, substantial reduction in power consumption can be realized. The amount of the increase in the transmit power level may be related to the duty factor. In the example given above, the increase in the transmit power level equals the inverse of the duty factor. Thus, a 50% duty factor equates to a two-fold increase in transmit power level.

Problems may arise with compressed mode operation if a significant number of mobile terminals 30 operate in a compressed mode at the same time. Because the mobile terminals 30 normally increase their transmit power in compressed mode, they will interfere with other users if too many mobile terminals 30 transmit at the same time in the compressed mode. Moreover, if a large number of mobile terminals 30 switch their transmitters on and off at the same time, there will be pronounced swings in uplink load versus time.

According to the present invention, the base station 10 or other network node (e.g., Radio Network Control (RNC) node) actively manages the transmit timing of a plurality of mobile terminals 30 operating in the compressed mode to prevent large fluctuations in uplink load over time. The general concept is to measure the uplink load multiple times over a defined transmission period to detect undesirably large fluctuations in the uplink load. If the fluctuations in the uplink load are large, the base station 10 can adjust the transmit timing of one or more mobile terminals 30 operating in the compressed mode to more evenly distribute the uplink load versus time. If the mobile terminals 30 are in soft handoff, the base stations 10 in the mobile terminal's active set may need to coordinate with one another.

Figure 4:
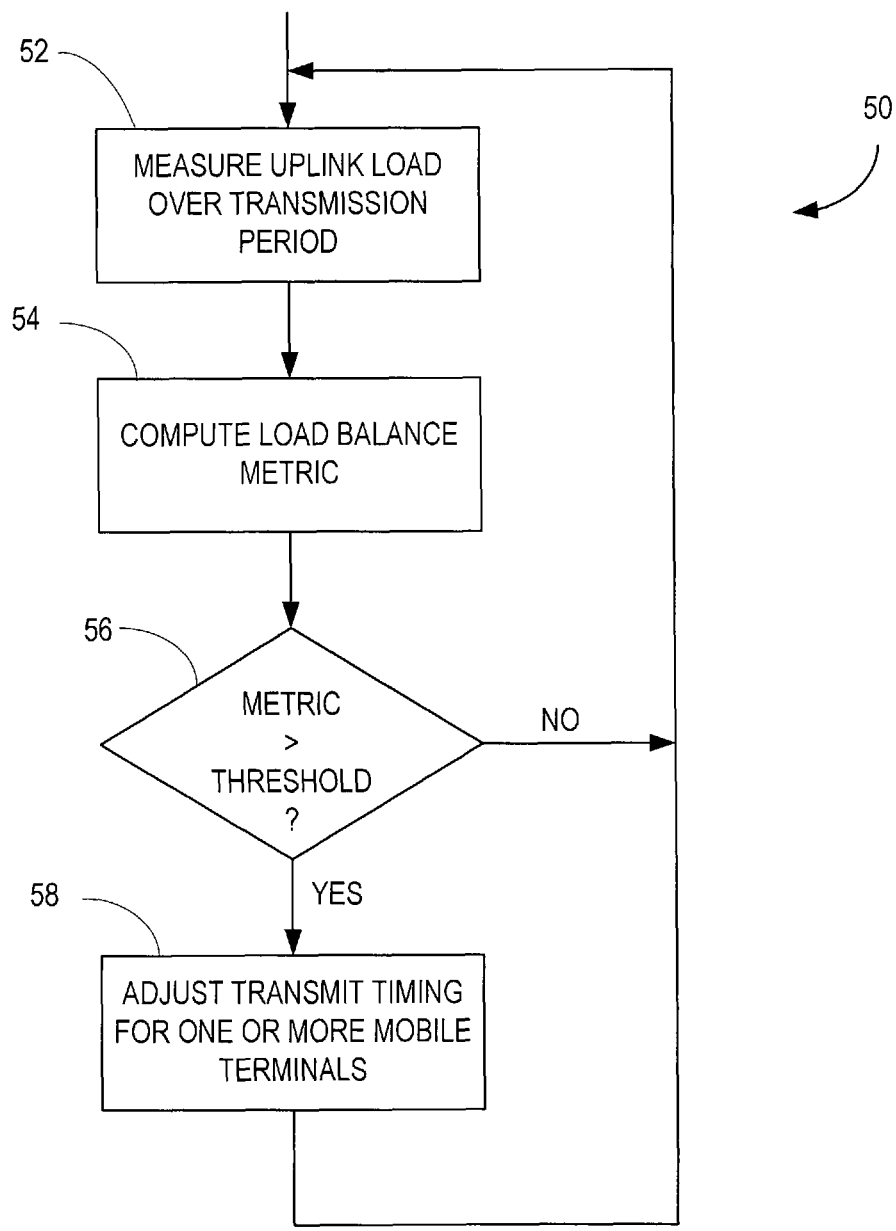
FIG. 4 is a flow chart illustrating an exemplary timing control process implemented by a base station.

FIG. 4 illustrates an exemplary method 50 implemented at a base station 10 or other network node to control transmit timing of one or more mobile terminals 30 operating in compressed mode. The base station 10 measures the uplink load multiple times during each transmission period (block 52). How the base station 10 measures the uplink load is not a material aspect of the invention. As one example, the base station 10 may use the receiver ADC output to measure the aggregate noise level over a transmission period. The time period for making measurements should be small relative to the transmission period so that multiple measurements can be made during the transmission period. In one embodiment, the base station 10 makes at least one measurement in each uplink transmit slot. Based on the load measurements, the base station 10 computes a metric representative of the load balance versus time (block 54). For example, the base station 10 may compute a load balance metric by computing the difference between the largest and smallest measurements in a transmission period. Alternatively, the base station 10 could compute the peak-to-average ratio of all of the measurements during a transmission period to obtain a load balance metric. Whatever method is used, the base station 10 compares the computed load balance metric to a defined threshold representing the maximum fluctuation that can be tolerated (block 56). If the metric exceeds the threshold, the base station 10 may take corrective measures to reduce the fluctuation in the uplink load (block 58). More particularly, the base station 10 may take corrective action by adjusting the transmit timing of one or more selected mobile terminals 30. The process 50 repeats in every transmission period.

The base station 10 selects one or more mobile terminals 30 or groups of mobile terminals 30 operating in the compressed mode to make timing adjustments. In one embodiment, the individual mobile terminals 30 or groups may be selected randomly. It may be noted that the selection process repeats in every transmission period so that random selection will eventually result in an acceptable noise level. Alternatively, the base station 10 may track the timing of all mobile terminals 30 operating in the compressed mode. If more than an average number of mobile terminals 30 have overlapping transmissions in a given time interval (e.g. one or more slots) resulting in excessive loading in that time interval, the base station 10 may select one or more of those mobile terminals 30 for timing adjustment.

Two exemplary methods are described herein for adjusting the transmit timing of the mobile terminals 30, though others can be used. According to a first method, the transmit timing for uplink transmissions by a selected mobile terminal 30 is adjusted by sending a timing control signal over a downlink control channel. A new downlink control channel may be defined for this purpose, or an existing control channel may be used. A second method requires that a compressed mode be enabled on both uplink and downlink channels. According to the second embodiment, the transmit timing of the mobile terminal 30 on the uplink channel in compressed mode is slaved to the transmit timing of the base station 10 on the downlink channel. In this case, the base station 10 can change the transmit timing on the uplink channel by changing the timing of its own transmissions on the downlink channel. It may be advantageous to interleave the transmission on the uplink and downlink respectively for a single mobile terminal 30 so that there is an opportunity to bypass the duplexer in the compressed mode to gain additional power savings.

Figure 5:
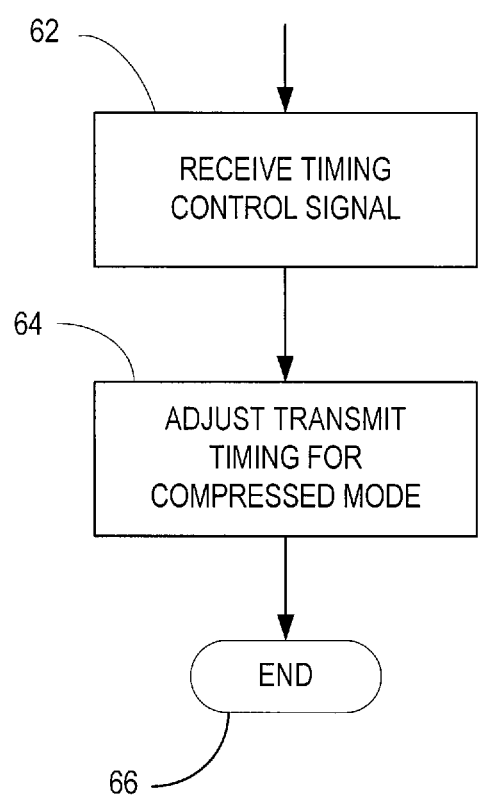
FIG. 5 is a flow chart illustrating an exemplary timing control process implemented by a mobile terminal.

FIG. 5 illustrates a procedure implemented by a mobile terminal 30 to adjust its transit timing on an uplink channel while in the compressed mode. In this method, the mobile terminal 30 receives a timing control signal from the base station 10, which may be transmitted over a downlink control channel (block 62). In response to the timing control signal, the mobile terminal 30 adjusts its transmit timing for compressed mode operation (block 64) and the procedure ends (block 66).

The timing control signal may indicate a transmit timing for the mobile terminal 30 explicitly. For example, the base station 10 may instruct the mobile terminal 30 to begin its uplink transmission in a particular transmit slot. The specification of the transmit slot can be indicated as an offset from the beginning of the transmission period. Alternatively, the mobile terminal 30 may be configured to shift its transmit timing in compressed mode by a fixed amount each time it receives a timing control signal from the base station 10. In this case, the timing control signal may comprise a single bit. For example, the mobile terminal 30 may be configured to shift its transmit timing in compressed mode by a predetermined number of slots (e.g., 6 slots) when the timing control bit is a "1." Thus, a mobile terminal 30 that begins its uplink transmission in slot 1, would shift to slot 7 when it receives a "1" from the base station 10.

The base station 10 may implement dedicated timing control, where the base station independently controls the timing of each mobile terminal 30. In this case, the timing control signals may be time multiplexed on a common control channel. The downlink control channel can be divided into frames, which may be further divided into a plurality of control slots Each mobile terminal 30 may be assigned to a specific control slot in the common downlink control channel to receive timing control signals. Alternatively, the base station 10 may implement common timing control wherein a single timing control signal is transmitted to all of the mobile terminals 30 over a common control channel, or to a specific group of mobile terminals 30.

Figure 6:
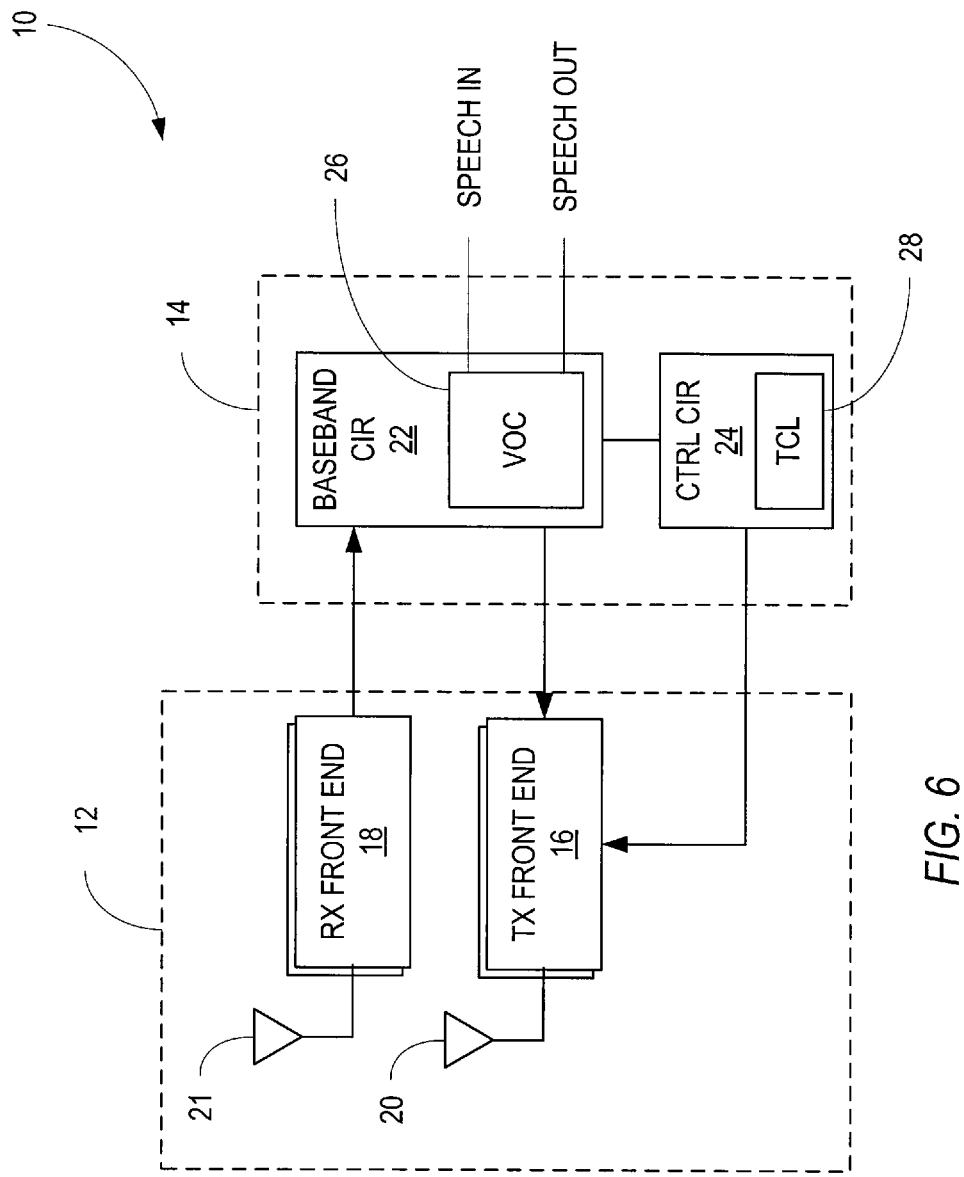
FIG. 6 illustrates an exemplary base station.

FIG. 6 illustrates an exemplary base station 10 according to one embodiment. The base station 10 comprises a radio frequency section 12 and a digital section 14. The radio frequency section 12 comprises a transmit circuit 16, a receiver circuit 18, and a transmit antenna 20 and a receive antenna 21. While only one transmit circuit 16 and receive circuit 18 is shown, those skilled in the art will appreciate that a base station 10 will typically include an array of transmit and receive circuits 16, 18 that it can allocate to different mobile terminals 30. The transmit circuit 16 upconverts, filters, and amplifies signals output by the digital section 14 for transmission via antenna 20. A D-to-A converter (not shown) converts signals output to the transmit circuit 16. Receive circuit 18 downconverts the receive signals to baseband frequency, and then filters and amplifies the received signal. An A-to-D converter (not shown) converts the receive signal to digital form for processing in digital section 14.

The digital section 14 comprises baseband circuit 22 and a control circuit 24. The baseband circuit 22 and control circuit 24 may comprise one or more processors or processing circuits. The baseband circuit 22 processes signals transmitted and received by the base station 10. The baseband circuit 22 encodes, modulates, and spreads the transmitted signals. On the receiver side, the baseband circuit 22 despreads, demodulates, and decodes received signals. The baseband circuit 22 also implements a vocoder 26 for encoding and decoding speech signals.

The control circuit 24 controls the overall operation of the base station 10. The control circuit 24 includes timing control logic (TCL) logic 28 for controlling the transmit timing of the mobile terminals 30 as described herein. The TCL 28 may, for example, implement the exemplary process shown in FIG. 4.

Figure 7:
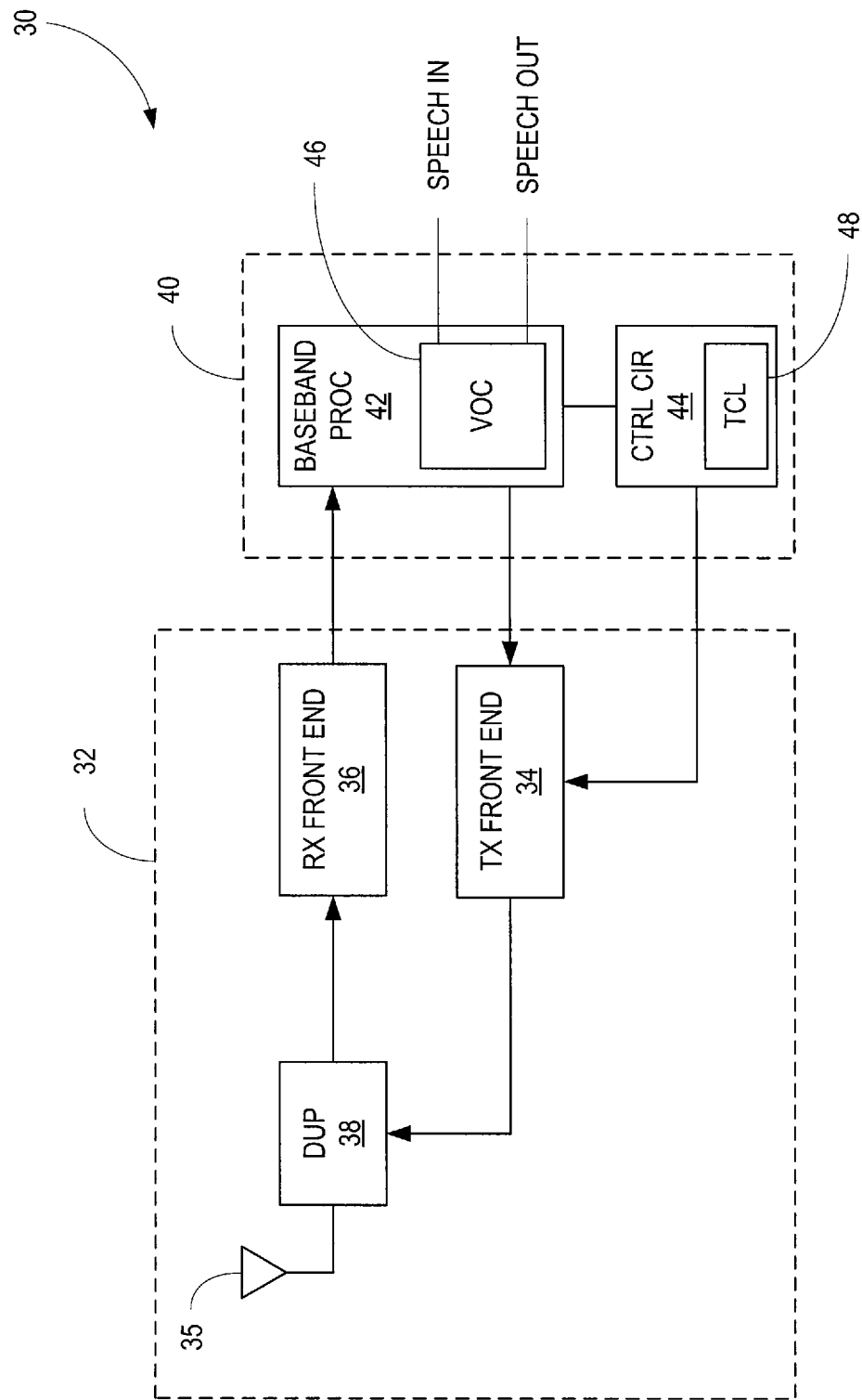
FIG. 7 illustrates an exemplary mobile terminal.

FIG. 7 illustrates an exemplary mobile terminal 30 according to one exemplary embodiment. The mobile terminal 30 comprises a radio frequency section 32 and a digital section 40. The radio frequency section 32 comprises a transmitter front end circuit 34, a receiver front end circuit 36, a duplexer 38, and a shared antenna 35. The transmitter front end circuit 34 upconverts, filters, and amplifies signals output by the digital section 40 for transmission via antenna 35. A D-to-A converter (not shown) converts signals output to the transmitter front end 34. Receiver front end circuit 36 downconverts the received signals to baseband frequency, and then filters and amplifies the received signals. An A-to-D converter (not shown) converts the received signals to digital form for processing in digital section 40. Duplexer 38, couples both the transmitter front end 34 and receiver front end 36 to the shared antenna 35.

The digital section 40 comprises a baseband processor 42 and control circuit 44. The baseband processor 42 and control circuit 44 may comprise one or more processors or processing circuits. The baseband processor 42 processes signals transmitted and received by the mobile terminal 30. For example, the baseband processor 42 encodes, modulates, and spreads transmitted signals. On the receiver side, the baseband processor 42 despreads, demodulates, and decodes the received signal. The baseband processor 42 also implements a vocoder 46 for encoding and decoding speech signals.

The control circuit 44 controls the overall operation of the mobile terminal 30. The control circuit 44 includes timing control logic 48 for adjusting uplink transmit timing in the compressed mode as herein described. When operating in compressed mode, the timing control logic (TCL) 48 is responsible for adjusting the uplink transmit timing responsive to timing control signals form the base station 10, as shown in FIG. 5.

While the present invention describes a method of reducing interference among mobile terminals 30 operating in a compressed mode, the same interference reduction techniques described can be applied in other situations where the mobile terminals 30 transmit repetitively in short bursts. Any intermittent transmission mode having a recurring pattern of ON bursts and OFF periods with the same periodicity occurring in multiple mobile terminals 30 will have the same problem of potentially overlapping ON periods causing increased interference in the base station receiver and can use the same techniques to reduce that interference. One such occurrence might be the transmission of low data rate services such as voice in short data bursts that occur at a fixed rate or a small number of fixed rates. The techniques may also be applied in OFDM systems.

The present invention provides a method and apparatus for controlling the transmit timing of a plurality of mobile terminals operating in a compressed mode so that undesirably large fluctuations in the uplink load can be reduced or minimized. The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of controlling transmit timing for one or more mobile terminals operating in an intermittent transmission mode, said method comprising:
   measuring uplink load at a base station at a plurality of times during a transmission period;
   determining a load balance metric indicative of fluctuations in the uplink load during the transmission period, based on the uplink load measurements;
   comparing the load balance metric to a predetermined threshold representing a maximum fluctuation that can be tolerated during the transmission period; and
   controlling the transmit timing for said one or more mobile terminals operating in said intermittent transmission mode to more evenly distribute the uplink load over subsequent transmission periods, if said load balance metric exceeds the predetermined threshold.

2. The method of claim 1 wherein controlling the transmit timing for one or more mobile terminals based on said load balance metric comprises transmitting a timing control signal to one or more mobile terminals over a downlink control channel.

3. The method of claim 1 wherein transmitting a timing control signal to one or more mobile terminals over a downlink control channel comprises transmitting a dedicated timing control signal to each mobile terminal.

4. The method of claim 1 wherein transmitting a timing control signal to one or more mobile terminals comprises transmitting a common control signal to a plurality of mobile terminals.

5. The method of claim 1 wherein controlling the transmit timing for one or more mobile terminals based on said load balance metric comprises:
   slaving the transmit timing of the mobile terminals on the uplink channel to the transmit timing on a downlink channel; and
   adjusting the transmit timing on the downlink channel to control the transmit timing of the mobile terminals.

6. A base station comprising:
   a transceiver for communicating with a plurality of mobile terminals over an uplink channel; and
   a control circuit configured to:
      determine a load balance metric indicative of fluctuations in the uplink load during a transmission period based on a plurality of measurements of the uplink load taken during the transmission period;
      compare the load balance metric to a predetermined threshold representing a maximum fluctuation that can be tolerated during the transmission period; and
      control the timing of intermittent uplink transmissions of one or more mobile terminals operating in an intermittent transmission mode if said load balance metric exceeds the predetermined threshold.

7. The base station of claim 6 wherein the control circuit is configured to transmit a timing control signal to one or more mobile terminals over a downlink control channel to control the transmit timing of the mobile terminals.

8. The base station of claim 6 wherein the control circuit is configured to transmit a dedicated timing control signal to each mobile terminal.

9. The base station of claim 6 wherein the control circuit is configured to transmit a common control signal to a plurality of mobile terminals.

10. The base station of claim 6 wherein the transmit timing of the mobile terminals on the uplink channel is slaved to the transmit timing on a downlink channel; and wherein the control circuit is configured to adjust the transmit timing on the downlink channel to control the transmit timing of the mobile terminals.

11. A method of controlling transmit timing of a mobile terminal operating in an intermittent transmission mode on an uplink channel, said method comprising:
   transmitting intermittently on an uplink channel via a transceiver when operating in an intermittent transmission mode, the intermittent transmission mode including an off period comprising a plurality of consecutive time slots within the transmission period during which the transceiver is turned off;
   receiving a timing control signal from a base station; and
   adjusting which time slots within the transmission period are included in the off period responsive to said timing control signal.

12. A mobile terminal comprising:
   a transceiver for transmitting intermittently on an uplink channel when operating in an intermittent transmission mode, the intermittent transmission mode including an off period comprising a plurality of consecutive time slots within the transmission period during which the transceiver is turned off; and
   a control circuit configured to adjust which time slots within the transmission period are included in the off period responsive to a timing control signal from a base station.

13. The method of claim 1, wherein the intermittent transmission mode comprises a compressed mode in a Code Division Multiple Access (CDMA) system.

14. The base station of claim 6, wherein the control circuit is configured to control the transmit timing for one or more mobile terminals operating in a compressed mode in a CDMA system.

15. The method of claim 11, wherein the intermittent transmission mode comprises a compressed mode in a Code Division Multiple Access (CDMA) system.

16. The mobile terminal of claim 12, wherein the intermittent transmission mode comprises a compressed mode in a Code Division Multiple Access (CDMA) system.

17. The method of claim 1 wherein, for each of the one or more mobile terminals, the intermittent transmission mode includes an off period comprising a plurality of consecutive time slots within the transmission period during which a transceiver of the mobile terminal is turned off, and wherein controlling the transmit timing for the one or more mobile terminals operating in the intermittent transmission mode comprises adjusting, for each of the one or more mobile terminals, which time slots within the transmission period are included in the off period.

18. The base station of claim 6 wherein, for each of the one or more mobile terminals, the intermittent transmission mode includes an off period comprising a plurality of consecutive time slots within the transmission period during which a transceiver of the mobile terminal is turned off, and wherein the control circuit is configured to control the transmit timing for the one or more mobile terminals operating in the intermittent transmission mode by adjusting, for each of the one or more mobile terminals, which time slots within the transmission period are included in the off period.

* * * * *